United States Patent [19]

Tada et al.

[11] 4,246,118
[45] Jan. 20, 1981

[54] APPARATUS FOR SEPARATING SOLID AND LIQUID

[75] Inventors: Masahisa Tada, Yokohama; Masahiko Kato, Machida; Tsuneo Ukita, Kawasaki; Hiroshi Segawa, Osaka; Masao Domoto, Izumi; Kiyoteru Mori, Nara; Kazuhiko Ishii, Suita; Shinobu Horinouchi, Yokohama; Masami Tsuzuki, Sakai; Eiichi Uemura, Suita, all of Japan

[73] Assignees: Nippon Paint Co., Ltd.; Mizuho Kogyo Kabushiki Kaisha, both of Osaka, Japan

[21] Appl. No.: 804,166

[22] Filed: Jun. 6, 1977

Related U.S. Application Data

[63] Continuation-in-part of Ser. No. 624,884, Oct. 22, 1975, abandoned.

[51] Int. Cl.³ ............................................. B01D 23/24
[52] U.S. Cl. .................................... 210/275; 210/277; 210/279; 210/354; 210/411
[58] Field of Search ............... 210/20, 80, 81, 108, 210/265, 274, 275, 277, 279, 354, 411, 425, 427

[56] References Cited

U.S. PATENT DOCUMENTS

| 402,543 | 4/1889 | Roeske | 210/274 X |
|---|---|---|---|
| 879,876 | 2/1908 | Jones et al. | 210/274 |
| 1,675,860 | 7/1928 | Neumann | 210/20 X |
| 1,794,841 | 3/1931 | Elfreth | 210/274 |
| 2,382,490 | 8/1945 | Lawlor | 210/20 |
| 3,077,987 | 2/1963 | Morimoto | 210/80 X |
| 3,506,125 | 4/1970 | Willis et al. | 210/274 |
| 3,523,889 | 8/1970 | Eis | 210/20 |
| 3,545,619 | 12/1970 | Ettlich | 210/20 |
| 3,613,888 | 10/1971 | Harris | 210/80 |

FOREIGN PATENT DOCUMENTS

| 967760 | 11/1950 | France. | |
| 903800 | 8/1962 | United Kingdom | 210/20 |

Primary Examiner—S. Leon Bashore
Assistant Examiner—Ferris H. Lander
Attorney, Agent, or Firm—Wenderoth, Lind & Ponack

[57] ABSTRACT

An apparatus for separating suspended solids from a liquid includes a tank, a floating bed of granular filter material held at the upper portion of the tank at the time of filtration, a feed pipe for feeding the liquid at a position between a filtering section and a sedimenting section, a hollow member or members which are arranged within the tank at a position below the position of the filter bed but above the position of the feed pipe, an air supply pipe which blows air up through the hollow member or members, thereby creating a turbulence required for effective backwashing, an arrangement for bringing the filter bed down to a position where the lowermost surface of the filter bed is held below a position substantially flush with the top end of the hollow member or members, a means for discharging a filtrate from the tank which is arranged in the top portion thereof, and a means for discharging a deposit of the suspended solids from the tank, which is equipped at the bottom portion thereof. The backwashing is carried out when the filter bed comes down to a desired level by blowing air from the air supply pipe through the hollow portion of the hollow member or members, thereby creating a turbulence in the filter bed and consequently removing the suspended solids entrapped in the interstices between the filter material particles. The water rinsing may be coupled with the air blowing.

34 Claims, 10 Drawing Figures

APPARATUS FOR SEPARATING SOLID AND LIQUID

This application is a continuation-in-part of my co-pending U.S. patent application Ser. No. 624,884 filed Oct. 22, 1975 now abandoned.

BACKGROUND OF THE INVENTION

1. Field of the Invention

The present invention relates to an apparatus for separating suspended solids from a suspension. More particularly, it relates to a solid-liquid separator with a filtering section and a sedimenting section combined together, in which a particulate filter material is floated in a suspension and which is designed so as to effectively backwash such a floating filter bed.

2. Description of the Prior Art

The clarification and filtration of suspended solids from a suspension has heretofore been carried out generally by means of a plurality of apparatuses as will be described in detail hereinbelow. This arrangement comprises mainly a separate combination of a clarifier and a filter. In a system having the arrangement described hereinabove, the filter is usually of a fixed-bed type in which a prefilt liquid is designed so as to flow downward and pass through the filter bed. The filter is generally a two-layer construction in which an upper layer that is made usually of sand having a filtering ability and finer particle size is arranged on top of a lower layer of coarser sand having substantially the same thickness. This construction, however, requires a large apparatus. This type of the apparatus arrangement has various additional disadvantages: i.e. its large space requirements, its operation complexity, its long-term backwashing time requirements, its necessity of a large amount of backwash liquor, its high cost, its required large number of laborers per unit time for building equipment and for carrying out operations, and its complex arrangement for transporting liquids.

Accordingly, some attempts have heretofore been made to improve the disadvantages of the conventional arrangements. A first attempt is said to be to combine a clarifier and a filter into one apparatus. Such an apparatus has been proposed as shown in U.S. Pat. No. 3,558,482 to Young. This apparatus employs a granular filter bed of graphite ore or anthracite ore or the like. It is stated that such beds may operate for long periods of time without backwashing. Since the apparatus adopts a fixed bed system, however, the disadvantages inherent in conventional filters using fixed beds are not said to be improved to a great extent. The system in the improved apparatus similarly requires complicated operating procedures and a large amount of water for backwashing. Moreover, any effective backwashing may not be expected so long as the fixed bed system is adopted.

Other attempts at improving the disadvantages involved in conventional apparatus arrangements have also been proposed in which a particular filter material is employed. One example of such an arrangement is an apparatus as shown in Japanese Patent Publication No. 5947/1960, in which the apparatus is arranged such that a filter is placed on top of a clarifier and two sections are partitioned by a perforated support plate. A granular filter material is held in the filter section. This type of apparatus generally comprises a floating filter bed and a means for discharging a rinsing liquid against the filter bed, such as a shower or a spray head with a plurality of nozzles along the header. The operation of such an apparatus will be described in detail hereinbelow. The apparatus may obviate some disadvantages of the conventional type apparatus arrangement in a separate construction with respect to the complex operation and large-scale equipment requirements, but the other disadvantages of the conventional separate-type apparatus arrangement have not been improved. An additional disadvantage of the apparatus of this type is that the cleaning of the filter bed by spraying a rinsing liquid against the bed in such a manner cannot give a satisfactory rinsing effect, thereby reducing the period of filtration to a great extent. This is true even where air is used for cleaning the filter bed in the apparatus instead of water.

SUMMARY OF THE INVENTION

It is therefore the primary object of the present invention to provide an apparatus for separating suspended solids from a suspension which obviates the disadvantages and difficulties involved in the prior art apparatuses.

It is another object of the present invention to provide an apparatus for separating solid and liquid, or a solid-liquid separator, in which the backwashing operation can be effected with great efficiency and with great ease.

A further object of the present invention is to provide a solid-liquid separator which can function to separate suspended solids from a suspension with a buoyant granular filter material and allow the suspended solids to sediment, the filter being provided with an effective means for backwashing.

Other objects, features and advantages of the present invention will become more apparent in the following description and from the accompanying drawings and the appended claims.

DESCRIPTION OF ILLUSTRATIVE EMBODIMENTS OF PRIOR ART

Figure 1:
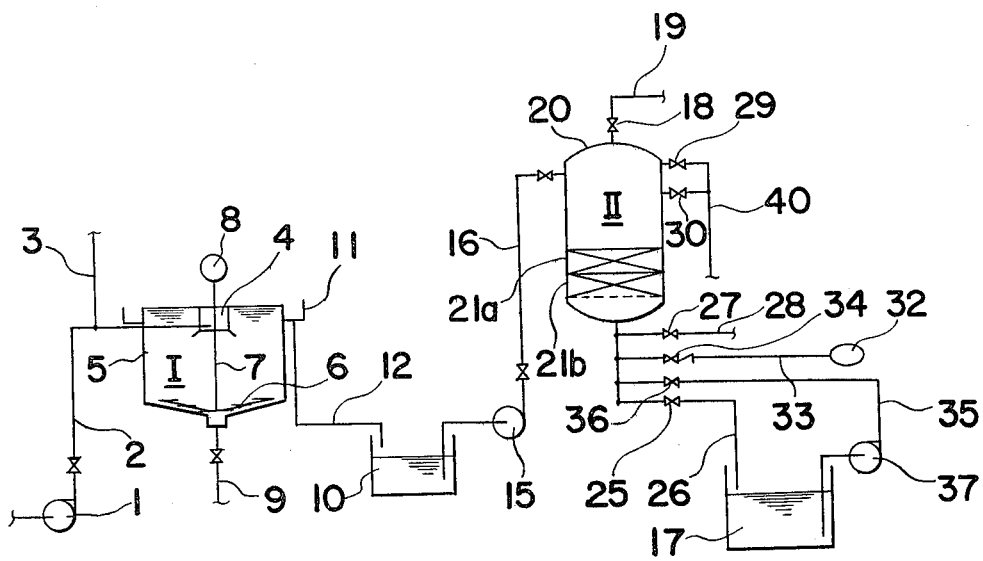
FIG. 1 is a schematic flow diagram of a prior art arrangement using a separate combination of a clarifier and a filter.

In the prior art embodiment shown in FIG. 1, which has been previously characterized as the typical prior art arrangement having a separate combination of a clarifier and a filter, the former designated here by number I is connected to the latter designated here by numeral II. A liquid containing suspended solids is fed to the clarifier I by pumping it by a pump 1 up through a feed pipe 2. To this feed is generally added a polymeric coagulant through a supply line 3 which is combined with the feed pipe before entering the clarifier. The liquid mixture is first led to a flocculator 4 positioned at the top portion of a precipitating tank 5, wherein flocs are allowed to become large. The liquid is then subjected to solid-liquid separation in the tank which is usually designed such that the liquid therein can flow upwardly at a linear velocity of about 1 meter per hour during a period of the solid-liquid separation. An improved clarifier which can allow the upward flow of the liquid at a linear velocity of about 2 meters per hour has also been employed. A large portion of the suspended solids present in the liquid is allowed to sediment as a slurry on the bottom of the precipitating tank. The slurry so sedimented is collected by means of rake arms or scrapers 6 attached to a rotatable axial shaft 7 which is driven rotatably by means of a drive motor 8 and then discharged therefrom through a discharge pipe 9.

The liquid portion of a suspension from which a large portion of the suspended solids was removed is led to a storage vessel 10 through an overflow conduit 11 and then to a discharge pipe 12. This prefilt liquid still contains the suspended solids generally on the order of several tens parts per million.

The prefilt liquid stored in the storage vessel 10 is then pumped by a pump 15 up through a feed pipe 16 to the filter II. A filter tank 20 of the filter contains two layers of filter media: i.e. upper layer of an 21a of sand having a finer particle size and a filtering ability on top of a lower layer 21b of coarser sand. The lower layer has almost the same thickness as and is a support layer for the upper layer. The suspended solids are entrapped in the interstices between sand particles and are thus separated from the liquid. A clean filtrate so obtained is discharged through a valve 25 and a discharge pipe 26 to a storage vessel 17 where the filtrate is stored for reuse.

The backwashing of the filter II may be carried out in the following manner. After the pump 15 is stopped with valve 25 shut, a valve 18 equipped in an air vent 19 is opened, and the liquid in the tank is discharged through a valve 27 and a discharge pipe 28 with valves 29 and 30 open. Thereafter, air is blown into the tank from an air blower 32 through an air supply pipe 33 and a valve 34 with the valves 27 and 30 shut. The supply of air is usually continued for 10 minutes. The blowing of the air can make the consolidation of the filter bed loosen and make the bed more susceptible to allowing liquid to pass therethrough. After the air supply is completed, the air blower 32 is turned off with the valve 34 closed. The backwashing is then carried out by supplying a backwash liquid to the tank through a supply pipe 35 and a valve 36 by pumping it up by a pump 37 from the storage vessel 17. The supply of the backwash liquid is usually continued for more than about 15 minutes at a linear velocity of 30 meters per hour in the tank. The backwash effluent is discharged through the valve 29 and the discharge pipe 40. After the backwashing is completed, the operation of the pump 37 is suspended, and the valves 18, 29 and 36 are shut. The tank is then allowed to stand for a while, for example for about 10 minutes. The filtration is then resumed in the same manner as described hereinabove. The filtrate obtained at the initial stage of filtration, for example for the initial period of about 5 to 10 minutes, is taken out of the tank through the discharge pipe 28 and returned to the storage vessel 10 or to a suitable place. When the liquid becomes clean to a desired quality, the filtration is resumed with the valve 25 opened and the valve 27 closed, in the same manner as described above.

Figure 2:
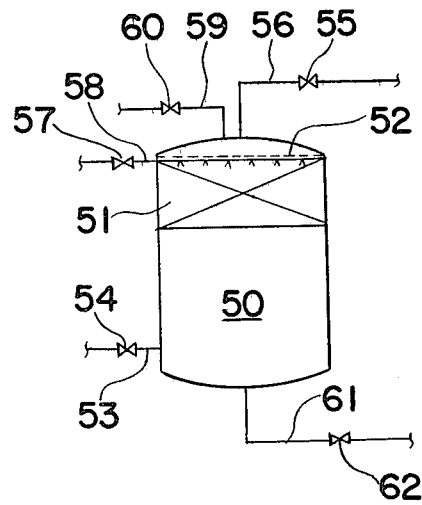
FIG. 2 is a flow diagram of a prior art solid-liquid separator with a clarifier and a filter combined.

In another prior art embodiment shown briefly in FIG. 2, which has been previously characterized as the prior art arrangement of the type having a construction with a clarifier and a filter combined together and using a buoyant filter material, a tank 50 contains a floating filter bed as indicated at 51. This filter bed is suspended in contact with the lower surface of a perforated support plate 52 having holes small enough to prevent the passage therethrough of the filter material particles. The tank 50 may be of any shape, and is usually of a closed, cylindrical shape. As shown in FIG. 2, the feed of a liquid containing suspended solids is carried out through a feed pipe 53 with a valve 54, such feed pipe being positioned at a lower portion of the tank. During the course of the feed, a valve 55 built into a filtrate discharge pipe 56 is also opened, such discharge pipe being provided at the top portion of the tank. The feed is then allowed to flow upwardly, and the suspended solids are entrapped in the interstices between the filter material particles. The continuous filtration operation causes the suspended solids to be retained in the interstices between the filter material granules and eventually clogs up the filter bed. This results in an increase in the inner pressure and would eventually lead to the cracking of the filter bed if the filtration were continued further. The differential pressure of the water at a point between the inlet and outlet sides amounts to, for example, 1.5 kilograms per square centimeter. The rinsing is effected by opening a valve 57 of a spraying pipe 58 after the halt of the feed and by spraying water against the filter bed. The spraying pipe is provided at its outlet portion with a spray head having a plurality of nozzles (not shown) and is positioned below the support plate. An overhead nozzle can also be employed instead of the spray head, which has a conical covering with a plurality of outlets through which the water is sprayed. The rinsing may also be carried out by employing air instead of water. The air may be blown in an upward or downward direction. With the apparatus arrangement of the conventional type as described herein, the differential pressure between the inlet and the outlet may be in a range of from 0.6 to 1.0 kilogram per square centimeter after the cleaning of the filter bed. The value is far greater than 0.2 kilogram per square centimeter which indicates a sufficient recovery of the filter beds by cleaning. Thus, a period for which the filtration was continued in the first run was about 20 hours, whereas the period for second or subsequent filtration decreased considerably to about 5 hours. This would result from lack in the recovery of the filter bed due to the insufficient segregation of the entrapped suspended solids from the filter bed. In the top portion of the tank is an air vent 59 with a valve 60. A drain 61 with a valve 62 is equipped in the bottom portion of the tank, whereby the drain is controlled.

DESCRIPTION OF PREFERRED EMBODIMENTS OF THE INVENTION

Figure 3:
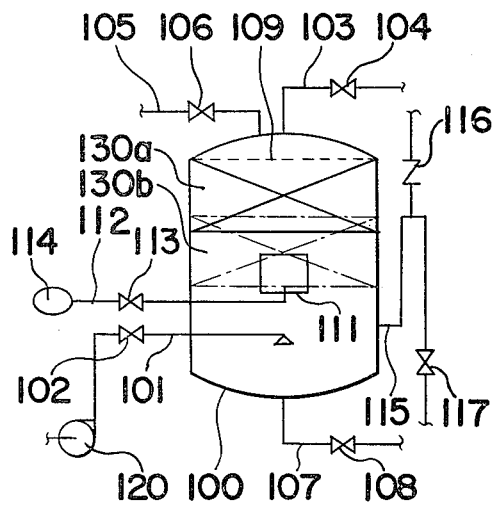
FIGS. 3–7 are each flow diagrams of the solid-liquid separator according to the present invention.
Figure 4:
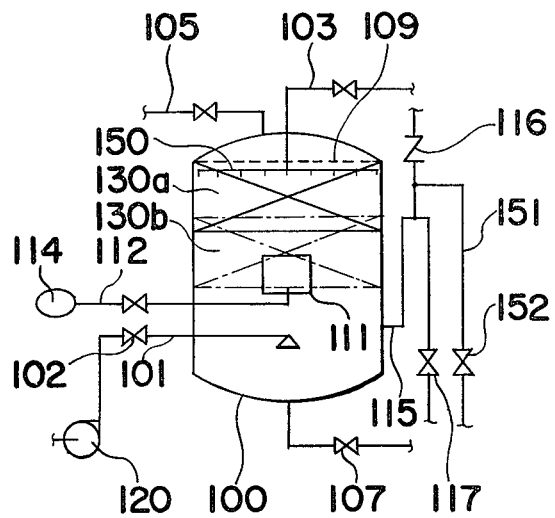
Figure 5:
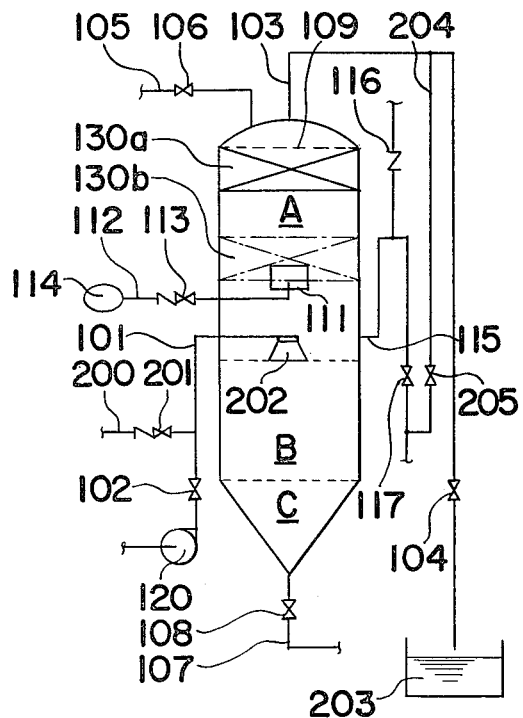
Figure 6:
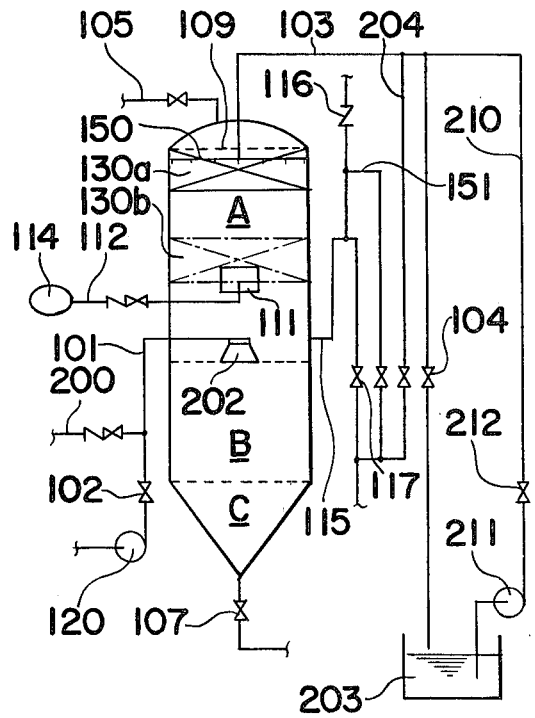

As shown in FIGS. 3–6, a solid-liquid separator of the present invention comprises a tank 100 which may be of any suitable shape and usually is of closed, cylindrical shape. FIGS. 3 and 4 show a tank with a bottom having a spheresegmental shape, and FIGS. 5 and 6 show a tank with a bottom having a converging conical shape. It should be noted, however, that the shape of the tank bottom is not limited to those illustrated in the accompanying drawings, and that it may vary, depending upon the nature of the suspension to be filtered.

The filter material to be used for the solid-liquid separator of the present invention may be any buoyant granular filter material having a smaller specific gravity than that of the suspension. It may be selected from any such filter materials known in the art and used for this purpose, varying with the kind of suspension to be filtered. For this purpose, polyethylene granules are commonly employed. The amount of filter materials to be employed in the apparatus of the present invention corresponds usually to the thickness of the filter bed to be integrated in the tank in a range of from about 30 centimeters to about 1 meter, and preferably from about 40 to 80 centimeters.

A solid-liquid separator of the type shown in FIGS. 3 and 4 is arranged particularly to be adapted to a system in which a liquid containing a relatively small quantity of suspending solids is filtered, although the application of the apparatus of this type should not be construed as being limited to such a system. In FIG. 4, some reference numbers in common to FIG. 3 are omitted for the sake of brevity.

As shown in FIGS. 3 and 4, a tank 100 is provided at its lower portion with a feed pipe 101 with a valve 102; at its top portion with a filtrate discharge pipe 103 having a valve 104 therein and with an air vent 105 having a valve 106; and at its bottom portion with a drain 107 equipped with a valve 108. In the upper portion of the tank, a perforated support plate 109 is arranged such that the filter bed is maintained below and in contact with the lower surface of the support plate, as shown at 130a. The perforated support plate has holes small enough to prevent the passage therethrough of the individual particulate filter materials.

A hollow member 111, the presence of which can cause the effective production of turbulence serving to aid the backwashing of the filter bed as will be hereinafter explained, is situated in the tank 100 and held in an intermediate position therein by any suitable means (not shown), for instance, by a support fixed on and extended from the inner wall of the tank. Preferably, however, the hollow member is positioned below the lower surface of the filter bed when the filter bed is in its uppermost position 130a against the holding plate 109 during actual filtration. Further, it is preferred that the hollow member be positioned well above the feed pipe even though all that is specifically required is that it be beneath the filter bed position 130a during filtration.

Figure 8:
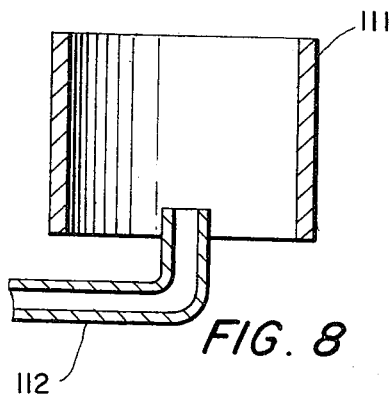
FIGS. 8 to 10 are respectively a cross sectional view, a plan view and a partially broken perspective view of one embodiment of the hollow member according to the present invention as shown in relationship with the air pipe.
Figure 9:
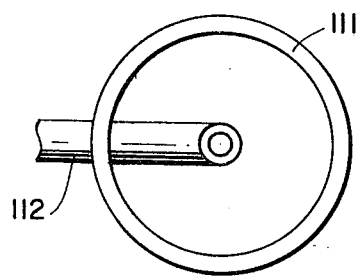
Figure 10:
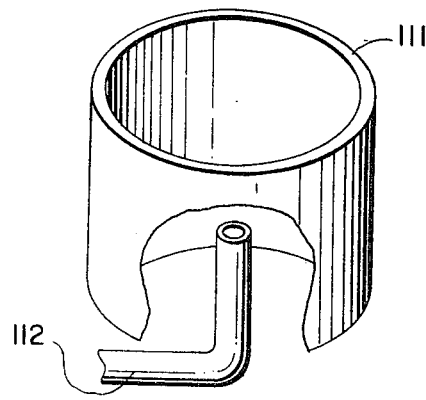

The hollow member 111 and the outlet of an air pipe 112 connected through a valve 113 to a blower 114 (see FIGS. 8 to 10) are so positioned that air blown through the pipe flows upward through the hollow portion of the hollow member. The hollow member may have any shape—for example, cylindrical or polygonal—but it must be larger in diameter than the air pipe 112. Further, the hollow member is to be so designed in size as satisfying the following formula:

$$A_1/50 \leq A_2 \leq A_1/2$$

wherein $A_1$ is the horizontally sectional area of the tank 100 and $A_2$ is the horizontally sectional area of the hollow member.

The height of the hollow member is preferably shorter than the thickness of the filter bed, but still higher than half the thickness of the filter bed. In light of this factor, it can be seen that the specific type of hollow member may primarily be selected on the basis of the size of the filter bed, and is thus dependent on the function the filter is to serve, since the filter bed must be adequate to satisfactorily separate the desired suspended solids from the liquid. Usually, however, the size of the hollow member is within the range of 15–50 cm. in height, and is preferably 20–40 cm. in height.

The proportion of the height (cm) and the horizontally sectional area (cm²) of the hollow member may be usually from 1:0.05 to 1:2. When the hollow member is in a cylindrical shape, the diameter of the horizontal section in circle may be, for instance, from 0.3 to 1.5 the times height.

Figure 7:
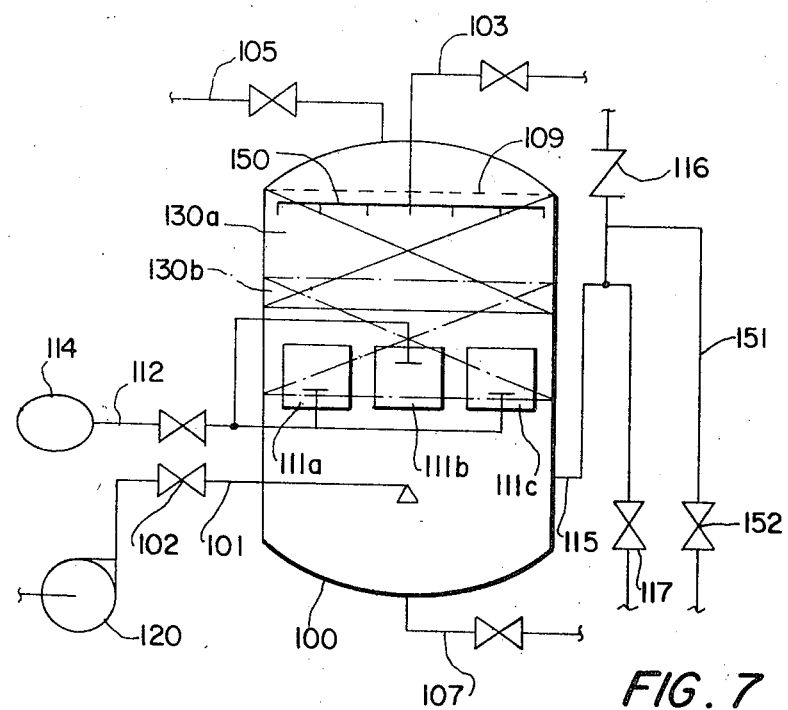

It is also possible that a plurality of hollow members 111a, 111b and 111c may be provided inside the tank (FIG. 7). In some instances where there is a plurality of hollow members, some of the hollow members may be designed so that rather than having the outlets of the air supply pipes discharge the air upward, the air from the air supply pipe will be discharged downwardly through the hollow member (111b in FIG. 7).

In association with the provision of the hollow member or members, a means for adjusting the position of the filter bed for backwashing is connected to the tank. The backwashing may be carried out after the filter bed is brought down to an appropriate position with said means for adjustment. Specifically, the adjustment may be effected after the halt of filtration by discharging the liquid in the tank through a discharge pipe 115 positioned in the lower portion of the tank wall, but below the position at which the hollow member or members are positioned. The discharge pipe is equipped with a valve 117. The discharge pipe is also provided with a siphon breaker 116 which is in turn arranged so as to operate to stop discharging as the discharging liquid head goes up to a position as high as the position of the upper surface of the filter bed, as represented by the chain lines at position 130b. The siphon breaker is also designed such that the drop of the filter bed is stopped when the lower surface of the bed drops to a desired position. The backwashing is then carried out. At the time of backwashing, the filter bed is positioned such that the lowermost surface thereof is within a range from substantially the same level as the top end of the hollow member to a level where it comes below the lowermost end of the hollow member. In most cases, however, the floating bed should not come down to a position where the top surface of the bed is below the top end of the hollow member. This may nevertheless be possible, although not preferred, only in an exceptional case when a plurality of the hollow members are provided at irregular positions and some of the hollow members, situated in positions higher than others are provided with outlets discharging air downwardly. It is preferred, however, that the lowermost surface of the bed descend to a position where it may envelope the hollow member therein with the lowermost surface of the bed situated below a substantially median portion of the hollow member. More preferably, the lowermost surface of the filter bed is situated within a range from a position corresponding to substantially median level of the hollow member to a position substantially flush with the lowermost end of the hollow member.

FIG. 4 is an improved arrangement of the solid-liquid separator as shown in FIG. 3, in which the filter discharge pipe 103 is connected to a strainer 150 positioned below the support plate member 109. The strainer is used herein to rinse the filter bed with a liquid at the time of backwashing, thereby facilitating washing out the suspended solids entrapped in the interstices between the filter material particles. The discharge pipe 115 is also provided with a tank liquid level control pipe 151 equipped with a valve 152, thereby making it easier to control the liquid level in the tank.

In the practice of the solid-liquid separator shown in FIGS. 3 and 4, the feed of a suspension containing suspended solids is carried out by pumping it by a pump 120 from a suitable source up through the feed pipe 101 with the valves 102, 104 opened. The feed may be mixed with a coagulant in order to facilitate the sedimentation of the suspended solids in the suspension before entering the tank 100. As has been described above, the apparatuses shown in FIGS. 3 and 4 are particularly applicable to a system in which a suspension containing a relatively small amount of suspended solids is filtered. In these cases, an inorganic coagulant such as aluminum sulfate, ferric chloride or polyaluminum chloride is preferred, although there is no limitation in the kind of a coagulant. Thus, a polymeric coagulant as will be illustrated hereinbelow may also be employed. The suspended solids having greater specific gravity than that of the suspension are allowed to sediment on the bottom of the tank. The liquid is caused to flow upwardly and pass through the floating filter bed. A clean filtrate is then taken out of the tank through the discharge pipe 103.

When the differential pressure between the inlet and the outlet reaches a point that indicates plugging of the filter bed, namely, it amounts to, for example, about 1.0 to 1.5 kilograms per square centimeter, the feed of the liquid is stopped. The backwashing operation is carried out in the following procedures. After the suspension of the feed by stopping the pump 120 and closing the valve 104, the liquid present in the tank is discharged through the discharge pipe 115 with the valve 117 opened, while the valve 106 of the air vent 105 is also opened. The floating filter bed drops as the liquid level is brought down to a position as indicated at 130b, i.e. to the position meeting the requirements as described hereinbelow. As the filter bed drops to a desired predetermined level, the siphon breaker 116 works to let the bed stay at the position. The drop of the filter bed can produce a space above the upper surface thereof, allowing the effective turbulence of the filter material particles at the time of backwashing. After the valve 117 is closed, the air blower 114 is operated with the valve 113 opened to blow into the filter bed through the air supply pipe 112 and the hollow member or members 111, thereby causing the turbulence in and the disruption of the filter bed. The amount of air needed for achieving an expected backwashing effect may be generally greater than 0.2, preferably from about 0.4 to 0.8, cubic meter per the cross-sectional area of the filter bed (in square meters) per unit time (in minutes). The force of the blown air will produce a turbulence in the filter bed and at the same time circulate the liquid by convection, whereby the filter bed disrupts and solids entrapped are removed from the filter material particles by the aid of the shear fractures and by impact due to collison of particles with one another. The entrapped solids which are separated upon backwashing become aggregated between each other, thereby making the aggregates likely to sediment and accumulate on the bottom of the tank. The supply of the air is continued generally for 20 minutes and then stopped; the blower 114 is turned off and the valve 113 is closed, thus allowing the filter materials to integrate into a new bed by themselves. After the integration of a new floating bed, the feed of a liquid to be filtered is resumed while the air in the tank is vented through the air vent 105. The resumption of the feed can bring the filter bed up to and in contact with the lower surface of the perforated support plate 109. The valve 106 is then shut, and a filtrate obtained for the initial period is discharged through the discharge pipe 103 for returning to a source where the liquid to be filtered is stored, because such a filtrate still contains a certain amount of the suspended solids. A deposit on the bottom of the tank is discharged through a drain 107.

Referring specifically to FIG. 4 alone, the filtration operation can be carried out in the same manner as with the apparatus shown in FIG. 3 until the air supply to the tank is completed in the backwashing operation. After the air is blown into the tank with the air blower 114 through the supply pipe 112, for example, for a period of about 5 minutes, the valve 117 is closed and the valve 152 is then opened. A supply of rinsing water is thereafter effected through the pipe 103 and the strainer 150 to discharge wter against the filter bed. The supply of rinsing water with the arrangement of this kind can increase the level of liquid corresponding in amounts to the supplied rinsing water, thereby at the same time increasing a range within which the filter material particles are violently agitated. The increase in the liquid level in the tank is caused to stop at a position corresponding to the maximum position of the liquid head in the pipe 151 and an additional amount of the rinsing water is discharged through the pipe 151. With this arrangement, suspended solids which are unlikely to sediment because of their small particle size and their light specific gravity can also be removed together with the rinsing water discharged through the liquid level control pipe. This is an effective way of rinsing and removing these suspended solids, as well as the entrapped solids which were removed upon backwashing. With this rinsing arrangement, the amount of rinsing water can be reduced to a considerable extent. The conventional apparatus otherwise requires a large amount of rinsing water for causing a turbulence in the filter bed, while the apparatus of the present invention employs air for turbulence. In the apparatus of the present invention, the amount of water needed for rinsing corresponds to the multiplication of three factors: the surface area of the filter bed; the velocity at which the rinsing water is fed, for example, about 10 meters per hour; and a period for rinsing, for example, 15 minutes. In the apparatus of the present invention, the amount of rinsing water can be reduced to an extent of about one-tenth to one-twentieth compared to the conventional apparatus as shown hereinabove. The rinsing effect is also better than that of the conventional apparatus. The rinsing operation is continued for a suitable period of time, and the operation is stopped by closing the valves 104 and 152, and stopping the supply of rinsing water. The operation subsequent thereto is conducted in the same manner as with the apparatus shown in FIG. 3.

For comparative purposes, the filtration was carried out with the apparatus shown in FIG. 3 as compared to the conventional apparatus shown in FIG. 2, each of the tanks having a diameter of 100 centimeters, and being provided with buoyant polyethylene granules having a thickness of 60 centimeters. A liquid containing suspended solids in the amount of 50 parts per million was employed, and a filtrate containing the amount of 3 parts per million of the solids was obtained in each case.

In the apparatus of the present invention, the second filtration was continued for about 15 hours with the same result, whereas the conventional apparatus was continued only for 5 hours in the second run in order to achieve the filtration giving a filtrate containing 3 p.p.m. of the suspended solids. The differential pressure between the inlet and the outlet at the time of the resumption of the second filtration was: from 0.6 to 1.0 kilogram per square centimeter for the conventional apparatus, and about 0.25 kilogram per square centimeter for the apparatus of the present invention. In the conventional apparatus, the floating filter bed was stirred in part or slowly with the expansion of the filter bed up to about 5 centimeter. The apparatus of this invention, on the other hand, allowed the filter bed to cause a vigorous turbulence and convection in the whole area with the great expansion of the filter bed to the extent of 30 to 40 centimeters.

The improved apparatus as shown in FIG. 4 can extend the second filtration period to about 20 hours from about 15 hours where the apparatus as shown in FIG. 3 is possible under the same conditions. Both the apparatuses indicate almost the same differential pressure between the inlet and the outlet at the start of the second and subsequent filtration operations: the differential pressure for the improved apparatus of FIG. 4 is 0.22 kilogram per square centimeter, and that of FIG. 3 is 0.25 kilogram per square centimeter.

The apparatuses as shown schematically in FIGS. 5 and 6 are further improved over those shown in FIGS. 3 and 4, respectively. These apparatuses are particularly suited for the separation and filtration of a suspension containing greater quantities of suspended solids. It is, of course, to be noted that they can also be applied without difficulty to the separation and filtration of a suspension where a relatively small amount of suspended solids is present. The tank for the apparatuses, as seen in FIGS. 5 and 6, may includes, for the purpose of the present disclosure, the following portions.

A filtering section, designated A, includes a floating of buoyant granular filter material held at an upper portion at the time of filtration. A liquid containing suspended solids is filtered through the filter bed.

A sedimenting section, designated B, at which the suspended solids are allowed to sediment and deposit down from the filter, is arranged below the filter section.

A depositing section, designated C, at which the flocs and aggregated solids which were removed from the filter bed are deposited as a slurry on the bottom of the tank, is arranged in the lowest portion of the tank. Partitions by which the tank is divided are described herein by the dotted lines only for the sake of the present description.

Although these categories are not adopted in FIGS. 3 and 4, it would obviously be understood that this kind of classification is undoubtedly applicable thereto in view of the nature of the apparatuses shown therein.

It should be noted, however, that such a division of one section from another is in itself of no importance and that no clear-cut partition dividing one from another is recognized. It is accordingly enough merely to note that the sections are tentatively named as above for the sake of brevity and may be defined in different way, but any such variations should be construed as being included in the same categories as set forth hereinabove.

It is preferred that the range of the sedimenting section, i.e. the range corresponding briefly to the distance or height from the bottom of a means for flocculation to the top portion of the depositing section, be as long as a distance nearly identical to or wider than the diameter of the tank. It is to be noted, however, that the range of the sedimenting section is not limited thereto and any variations in size may be possible and should be understood as being included within the scope of the present invention.

The depositing section is preferably designed such that it is of a converging cone shape, although its shape is not limited thereto. Thus, the bottom portion of the tank is advantageously arranged so as to have an inclination at an appropriate angle easy to collect and discharge a deposit of suspended solids from the tank, preferably at an angle of about 60 degrees, but the angle according to the present invention should not be construed as being limited thereto. The shape of the tank bottom may vary depending largely upon the nature of suspended solids in a liquid to be filtered.

The apparatuses shown in FIGS. 5 and 6 according to the present invention can be operated in the same manner as those shown in FIGS. 3 and 4, respectively, unless otherwise stated hereinbelow. Although some reference numerals in FIGS. 5 and 6 are not specifically described, it is to be noted that they correspond to those employed in FIGS. 3 and 4.

Referring now to FIGS. 5 and 6, the feed of a liquid containing suspended solids may be admixed with a coagulant prior to the introduction into the tank. The coagulant is supplied from a suitable source through a supply pipe 200 with a valve 201 to the feed pipe 101. As set forth hereinabove, this type of apparatus is preferably applicable to the separation and filtration of a suspension containing a greater amount of suspended solids. In this case, the use of a polymeric coagulant for this apparatus is not limited to said examples and such a coagulant as being employed for the apparatuses shown in FIGS. 3 and 4 may also be used. The feed pipe is connected at its outlet portion to a flocculator 202. The flocculator is provided with a means for guiding the flow of the feed liquid that has entered it, in a downward direction. A path through which the feed liquid passes may be provided with a plurality of baffles or any other suitable means, thereby creating a turbulence required to mix the feed with the coagulant well and consequently producing and enlargening flocs. Thus, the feed is supplied in a direction tangent to the flocculator positioned on center in the tank and allowed to pass downwardly through the path therein through which the flocs are formed and become large. The mixture containing such flocs is then discharged downwardly into the sedimenting section where the suspended solids are allowed to sediment and deposit by gravity in the depositing section of the tank. With the gravitational sedimentation, a large amount of the suspended solids are removed from the liquid. The liquid so treated still contains a certain amount of unsedimented solids. The unsedimented solids are then removed by filtration through a floating bed of a particulate filter material equipped in the tank. Such a prefilt liquid is blown upwardly and passed through the filter bed, thereby removing the unsedimented solids and giving a clean filtrate. The filtrate discharged through the discharge pipe 103 is stored in a storage vessel 203 for reuse.

As the filtration is continued, the filter bed is plugged by the suspended solids entrapped in the interstices between the individual filter material granules. The backwashing is then carried out in the same manner as the apparatuses shown in FIGS. 3 and 4, when the differential pressure between the inlet and the outlet reaches a point indicating that the filter bed is plugged. In these apparatuses, a hollow member or members 111 are arranged on center in the tank at the filtering section, i.e. below the position of the filter bed which is retained by the plate member at the time of filtration, but above the position of the feed pipe 101. As long as these requirements are met, the hollow member or members can be arranged at any position in the filtering section, but it is preferred that the hollow member or members be positioned well above the position of the flocculator so as to disallow the filter material particles, when violently agitated by the blow of air, to be brought into contact with the flocculator.

As shown in FIGS. 5 and 6, the filtrate discharge pipe 103 diverts into a branch pipe 204 equipped with a valve 205, whose branch pipe is then combined with the pipe 115 and led to a source in which the feed liquid is stored.

Referring specifically now to FIG. 6, the apparatus arrangement is substantially the same as a combination of those shown in FIGS. 4 and 5. Accordingly, this apparatus can be operated in substantially the same manner as the combined operations of those apparatuses as shown in FIGS. 4 and 5, unless otherwise stated hereinbelow. This apparatus is designed so as to further improve a combination of the two apparatuses, in which an additional improvement is the provision of an arrangement capable of reusing a clean filtrate stored in the storage vessel 203 as a rinsing liquid at the time of backwashing. For this purpose, a supply pipe 210 is connected to the filtrate discharge pipe 103 which can also act as supplying a rinsing liquid in the apparatus of this type as in the apparatus shown in FIG. 4. The supply pipe 210 is provided with a supply pump 211 which can pump the filtrate in the storage vessel up through a pipe 212 an the pipe 103 to the strainer 150.

It is to be noted that the apparatuses shown in FIGS. 5 and 6 can provide substantially the same results as those shown in FIGS. 3 and 4, respectively, because of the identity and similarity of the arrangement and operation. Since the improvement in the apparatuses shown in FIGS. 5 and 6 resides in the construction of the tank as set forth hereinabove, they are particularly suited for the separation and filtration of a liquid containing a greater amount of suspended solids. In other respects, the apparatus according to the present invention can improve the disadvantages of conventional apparatus arrangements to a substantially equal extent.

What is claimed is:

1. An apparatus for treating a liquid having solids suspended therein by separating said solids from said liquid, said apparatus comprising:
   a tank;
   feed means for introducing a liquid having solids suspended therein into the interior of said tank and for causing said liquid to move upwardly through said tank;
   filter means for filtering said solids from said liquid during upward movement thereof through said tank, said filter means comprising a bed of buoyant granular filter material positioned within said tank and adapted to be floated by said liquid therein at an upper location above said feed means and whereat said liquid passes through said bed, thereby separating said solids from said liquid to form a liquid filtrate and retaining said solids within said bed;
   perforated support plate means, positioned at a level within an upper portion of said tank, for allowing said liquid filtrate to pass therethrough and for preventing said filter material from passing therethrough and for rising above said level;
   filtrate discharge means, at a top portion of said tank and above said bed and said plate means, for discharging said liquid filtrate from said tank;
   air vent means, at said top portion of said tank, for venting air from the interior of said tank;
   means for periodically backwashing said bed by removing from said bed said solids retained therein during the separation of said solids from said liquid, said removing means comprising:
      an air supply source positioned outside said tank;
      air delivery means, connected to said air supply source, for supplying air from said source into said tank, said air delivery means including at least one air discharge end located within said tank;
      at least one hollow member positioned within said tank at a location surrounding and spaced around said air discharge end of said air delivery means, said hollow member being at a position below said bed when said bed is in said upper location thereof;
      means, connected to said tank at a position below said hollow member, for adjusting the level of said liquid within said tank and for thereby causing said bed to be lowered from said upper location thereof to a lower location whereat the lowermost surface of said bed is at a level between a position substantially level with the upper end of said hollow member and a position below the lower end of said hollow member; and
      said hollow member having a diameter greater than said air delivery means, and upper and lower ends of said hollow member being open and unobstructed, whereby when said bed is in said lower location thereof and when air is discharged from said air discharge end of said air delivery means, said air is blown through said hollow member into said bed, thereby causing turbulence in said bed and circulation by convection of said liquid, with resultant disruption of said bed and removal therefrom of said retained solids; and
   solids discharge means at the bottom of said tank for removing said solids therefrom.

2. An apparatus as claimed in claim 1 wherein a plurality of said hollow members are provided.

3. An apparatus as claimed in claim 2 wherein at least one of said hollow members serves to direct the air from the corresponding air delivery means downwardly.

4. An apparatus as claimed in claim 1 wherein said lowermost surface of said filter bed is below a substantially median portion of said hollow member when said filter bed is in said lower location thereof.

5. An apparatus as claimed in claim 1 wherein said lowermost surface of said filter bed comes within the range of from a position corresponding to a substantially median level of said hollow member to a position substantially flush with said lower end of said hollow member when said filter bed is in said lower location thereof.

6. An apparatus as claimed in claim 1 further comprising:
   rinse liquid discharging means operatively connected to said filtrate discharge means for discharging rinse liquid to said filter bed, said rinse liquid discharging means being positioned beneath said perforated support plate means within said filter bed during filtration through said filter bed.

7. An apparatus as claimed in claim 1 wherein said buoyant bed of granular filter material is comprised of polyethylene granules.

8. An apparatus as claimed in claim 1 further comprising:
    liquid level regulating means connected to said adjusting means for regulating the level of liquid in said tank at a predetermined level during the backwashing of said filter bed.

9. An apparatus as claimed in claim 1 wherein said air delivery means supplies air in an amount greater than 0.2 cubic meter per square meter of the cross-sectional area of the filter bed per unit time.

10. An apparatus as claimed in claim 9 wherein said amount of air is from approximately 0.4 to 0.8 cubic meter per square meter of the cross-sectional area of the filter bed per unit time.

11. An apparatus as claimed in claim 1 further comprising coagulant supply means connected to said feed means for feeding a coagulant with said liquid to be filtered.

12. An apparatus as claimed in claim 11 wherein said coagulant supply means supplies an inorganic coagulant.

13. An apparatus as claimed in claim 11 wherein said coagulant supply means supplies a polymeric coagulant.

14. An apparatus as claimed in claim 11 wherein said tank has a depositing portion at the bottom thereof for collecting solids.

15. An apparatus as claimed in claim 14 wherein a plurality of said hollow members are provided.

16. An apparatus as claimed in claim 15 wherein at least one of said hollow members serves to direct the air from the corresponding air delivery means downwardly.

17. An apparatus as claimed in claim 14 wherein said lowermost surface of said filter bed is below a substantially median portion of said hollow member when said filter bed is in said lower location thereof.

18. An apparatus as claimed in claim 14 wherein said lowermost surface of said filter bed comes within the range of from a position corresponding to a substantially median level of said hollow member to a position substantially flush with said lower end of said hollow member when said filter bed is in said lower location thereof.

19. An apparatus as claimed in claim 14 further comprising:
    rinse liquid discharging means operatively connected to said filtrate discharge means for discharging rinse liquid to said filter bed, said rinse liquid discharging means being positioned beneath said perforated support plate means within said filter bed during filtration through said filter bed.

20. An apparatus as claimed in claim 14 wherein said buoyant bed of granular filter material is comprised of polyethylene granules.

21. An apparatus as claimed in claim 14 further comprising:
    liquid level regulating means connected to said adjusting means for regulating the level of liquid in said tank at a predetermined level during the backwashing of said filter bed.

22. An apparatus as claimed in claim 14 wherein said air delivery means supplies air in an amount greater than 0.2 cubic meter per square meter of the cross-sectional area of the filter bed per unit time.

23. An apparatus as claimed in claim 22 wherein said amount of air is from approximately 0.4 to 0.8 cubic meter per square meter of the cross-sectional area of the filter bed per unit time.

24. An apparatus as claimed in claim 14 further comprising floculating means attached to the discharge end of said feed means for floculating and guiding downward the liquid entering into said tank through said feed means.

25. An apparatus as claimed in claim 24 further comprising mixing means within said feed means for creating a mixing turbulence in said feed means.

26. An apparatus as claimed in claim 24 wherein a plurality of said hollow members are provided.

27. An apparatus as claimed in claim 26 wherein at least one of said hollow members serves to direct the air from the corresponding air delivery means downwardly.

28. An apparatus as claimed in claim 24 wherein said lowermost surface of said filter bed is below a substantially median portion of said hollow member when said filter bed is in said lower location thereof.

29. An apparatus as claimed in claim 24 wherein said lowermost surface of said filter bed comes within the range of from a position corresponding to a substantially median level of said hollow member to a position substantially flush with said lower end of said hollow member when said filter bed is in said lower location thereof.

30. An apparatus as claimed in claim 24 further comprising:
    rinse liquid discharging means operatively connected to said filtrate discharge means for discharging rinse liquid to said filter bed, said rinse liquid discharging means being positioned beneath said perforated support plate means within said filter bed during filtration through said filter bed.

31. An apparatus as claimed in claim 24 wherein said buoyant bed of granular filter material is comprised of polyethylene granules.

32. An apparatus as claimed in claim 24 further comprising:
    liquid level regulating means connected to said adjusting means for regulating the level of liquid in said tank at a predetermined level during the backwashing of said filter bed.

33. An apparatus as claimed in claim 24 wherein said air delivery means supplies air in an amount greater than 0.2 cubic meter per square meter of the cross-sectional area of the filter bed per unit time.

34. An apparatus as claimed in claim 33 wherein said amount of air is from approximately 0.4 to 0.8 cubic meter per square meter of the cross-sectional area of the filter bed per unit time.

* * * * *